(12) United States Patent
Hara et al.

(10) Patent No.: US 11,151,221 B2
(45) Date of Patent: Oct. 19, 2021

(54) PROBABILITY DENSITY RATIO ESTIMATION

(71) Applicant: INTERNATIONAL BUSINESS MACHINES CORPORATION, Armonk, NY (US)

(72) Inventors: Satoshi Hara, Tokyo (JP); Tetsuro Morimura, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 974 days.

(21) Appl. No.: 15/452,196

(22) Filed: Mar. 7, 2017

(65) Prior Publication Data
US 2018/0260721 A1 Sep. 13, 2018

(51) Int. Cl.
*G06F 17/18* (2006.01)
*G06N 20/20* (2019.01)
*G06N 5/00* (2006.01)

(52) U.S. Cl.
CPC ........... *G06F 17/18* (2013.01); *G06N 5/003* (2013.01); *G06N 20/20* (2019.01)

(58) Field of Classification Search
CPC ...... G06T 7/0012; G16H 50/20; G06N 20/00; G06N 7/005; G06N 3/08; G06N 5/02; G06N 5/003; G06K 9/6282; G06F 16/285; G06F 16/2246; G06F 17/18
See application file for complete search history.

(56) References Cited

U.S. PATENT DOCUMENTS 8,954,365 B2   2/2015 Criminisi et al.

OTHER PUBLICATIONS

Liu et al., "Random Forest Construction With Robust Semisupervised Node Splitting," 2015, IEEE Transactions on Image Processing, vol. 24, No. 1, pp. 471-483 (Year: 2015).*
Kanamori et al., "Statistical analysis of kernel-based least-squares density-ratio estimation," 2012, Machine Learning 86:335-367 (Year: 2012).*
Rogez et al., "Randomized Trees for Human Pose Detection," 2008, IEEE Conference on Computer Vision and Pattern Recognition, pp. 1-8 (Year: 2008).*
Schroff et al., "Object Class Segmentation using Random Forests," 2008, BMVC, pp. 1-10 (Year: 2008).*
Wald et al., "Optimum Character of the Sequential Probability Ratio Test," 1948, The Annals of Mathematical Statistics, vol. 19, No. 3, pp. 326-339 (Year: 1948).*

(Continued)

*Primary Examiner* — Miranda M Huang
*Assistant Examiner* — Catherine F Lee
(74) *Attorney, Agent, or Firm* — Tutunjian & Bitetto, P.C.; Randall Bluestone

(57) ABSTRACT

Probability density ratios may be estimated by a method including obtaining a first sample set including a plurality of first samples and a second sample set including a plurality of second samples, wherein each of the first samples and the second samples is represented as a vector including a plurality of parameters, constructing at least one decision tree estimating a ratio of probability density $p(x)/q(x)$ based on the first sample set and the second sample set, wherein $p(x)$ is a probability density of the first samples corresponding to an input vector x and $q(x)$ is a probability density of the second samples corresponding to the input vector x.

15 Claims, 8 Drawing Sheets

(56) References Cited

OTHER PUBLICATIONS

Bosch et al., "Image Classification using Random Forests and Ferns," 2007, IEEE, 8 pages (Year: 2007).*

Suzuki, T. et al., "Mutual Information Approximation via Maximum Likelihood Estimation of Density Ratio" ISIT (Jun.-Jul. 2009) pp. 463-467.

Suzuki, T. et al., "Mutual information estimation reveals global associations between stimuli and biological processes" BMC Bioinformatics (Jan. 2009) pp. 1-12, vol. 10, Suppl I.

Suzuki, T. et al, "Estimating Squared-loss Mutual Information for Independent Component Analysis" International Conference on Independent Component Analysis and Signal Separation (Mar. 2009) pp. 130-137, vol. 5441.

Sugiyama, M. et al., "Conditional Density Estimation via Least-Squares Density Ratio Estimation" Proceedings of the 13th International Conference on Artificial Intelligence and Statistics (AISTATS) (Jan. 2010) pp. 781-788 , vol. 9.

Yamada, M. et al., "Dependence Minimizing Regression with Model Selection for Non-Linear Causal Inference under Non-Gaussian Noise" Proceedings of the Twenty-Fourth AAAI Conference on Artificial Intelligence (AAAI-10) (Jul. 2010) pp. 643-648.

Ram, P. et al., "Density Estimation Trees" Proceedings of the 17th ACM SIGKDD international conference on Knowledge discovery and data mining (Aug. 2011) pp. 627-635.

Sugiyama, M. et al., "Covariate Shift Adaptation by Importance Weighted Cross Validation" Journal of Machine Learning Research (May 2007) pp. 985-1005, vol. 8.

Liu, X. et al., "Semi-supervised Node Splitting for Random Forest Construction" 2013 IEEE Conference on Computer Vision and Pattern Recognition (CVPR) (Jun. 2013) pp. 492-499.

Chakaravarthy et al., "Approximating Decision Trees with Multiway Branches," 2009, ICALP 2009, Part I, LNCS 5555, pp. 210-221 (Year: 2009).

Murthy et al., "Decision Tree Induction: Flow Effective is the Greedy Heuristic?," 1995, KDD-95 Proceedings, AAAI, pp. 222-227 (Year: 1995).

Office Action dated Dec. 30, 2020 for U.S. Appl. No. 15/797,051, 21 pages.

* cited by examiner

PROBABILITY DENSITY RATIO ESTIMATION

BACKGROUND

Technical Field

The present invention relates to estimation of a ratio of probability density. More specifically, the present invention relates to estimation of a probability density ratio based on a tree.

Related Art

A ratio of two probability density functions appears in several tasks in machine learning as shown in Covariate Shift Adaptation by Importance Weighted Cross Validation (M. Sugiyama et al., 2007), Conditional Density Estimation via Least-Square Density Ratio Estimation (M. Sugiyama et al., 2010), Mutual Information Approximation via Maximum Likelihood Estimation of Density Ratio (T. Suzuki et al., 2009), Mutual Information Estimation Reveals Global Associations between Stimuli and Biological Process (T. Suzuki et al., 2009), Estimating Squired-loss Mutual Information for Independent Component Analysis (T. Suzuki and M. Sugiyama, 2009), and Dependence Minimizing Regression with Model Selection for Non-linear Causal Inference under Non-Gaussian Noise (M. Yamada and M. Sugiyama, 2010).

Conventional methods for estimating the ratio of probability density functions rely on nonparametric regression, which requires specifying appropriate basis functions. The estimation of the ratio is affected by a selection of the basis function and is often not sufficiently accurate. Further computational resources are required for accurate estimation of the ratio of probability density function using such conventional methods.

SUMMARY

According to a first aspect of the present invention, provided is a method including obtaining a first sample set including a plurality of first samples and a second sample set including a plurality of second samples, wherein each of the first samples and the second samples is represented as a vector including a plurality of parameters, constructing at least one decision tree estimating a ratio of probability density $p(x)/q(x)$ based on the first sample set and the second sample set, wherein $p(x)$ is a probability density of an input vector x in the first sample set and $q(x)$ is a probability density of the input vector x in the second sample set. According to the first aspect, the method may estimate the ratio of probability density $p(x)/q(x)$ without tuning a basis function and may improve accuracy of the estimation with less computational resources than conventional methods.

According to a second aspect of the present invention, optionally provided is the method of the first aspect, where the constructing at least one decision tree includes constructing a plurality of decision trees, each decision tree outputting a corresponding ratio of probability density $p(x)/q(x)$. According to the second aspect, the method may improve accuracy of the estimation by utilizing the plurality of decision trees.

According to a third aspect of the present invention, optionally provided is the method of the first aspect or the second aspect, where the decision tree outputs a ratio of a rate of the first samples allocated to a leaf node of the decision tree and a rate of the second samples allocated to the leaf node of the decision tree. According to the third aspect, the method may obtain the ratio of probability density from the decision tree.

According to a fourth aspect of the present invention, optionally provided is the method of any one of the first through third aspects, the constructing at least one decision tree includes: determining a branching condition at a target leaf of the at least one decision tree, and branching the target leaf according to the branching condition to generate a plurality of new leafs by dividing the first samples of the target leaf according to the branching condition, and dividing the second samples of the target leaf according to the branching condition. According to the fourth aspect, the method may construct the decision tree based on the first samples and the second samples.

According to a fifth aspect of the present invention, optionally provided is the method of any one of the fourth aspects, where the determining a branching condition includes: determining a parameter and a threshold for the target leaf such that an output of an objective function corresponding to the branching condition is minimized, wherein the objective function approximates a squared error of an estimation of the ratio of probability density. According to the fifth aspect, the method may enable to construct the decision tree that outputs an accurate estimation of the ratio of probability density with less computational resource.

The foregoing aspects may also include an apparatus performing the methods, and a program product having instructions that cause a processor or programmable circuitry to perform the method.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
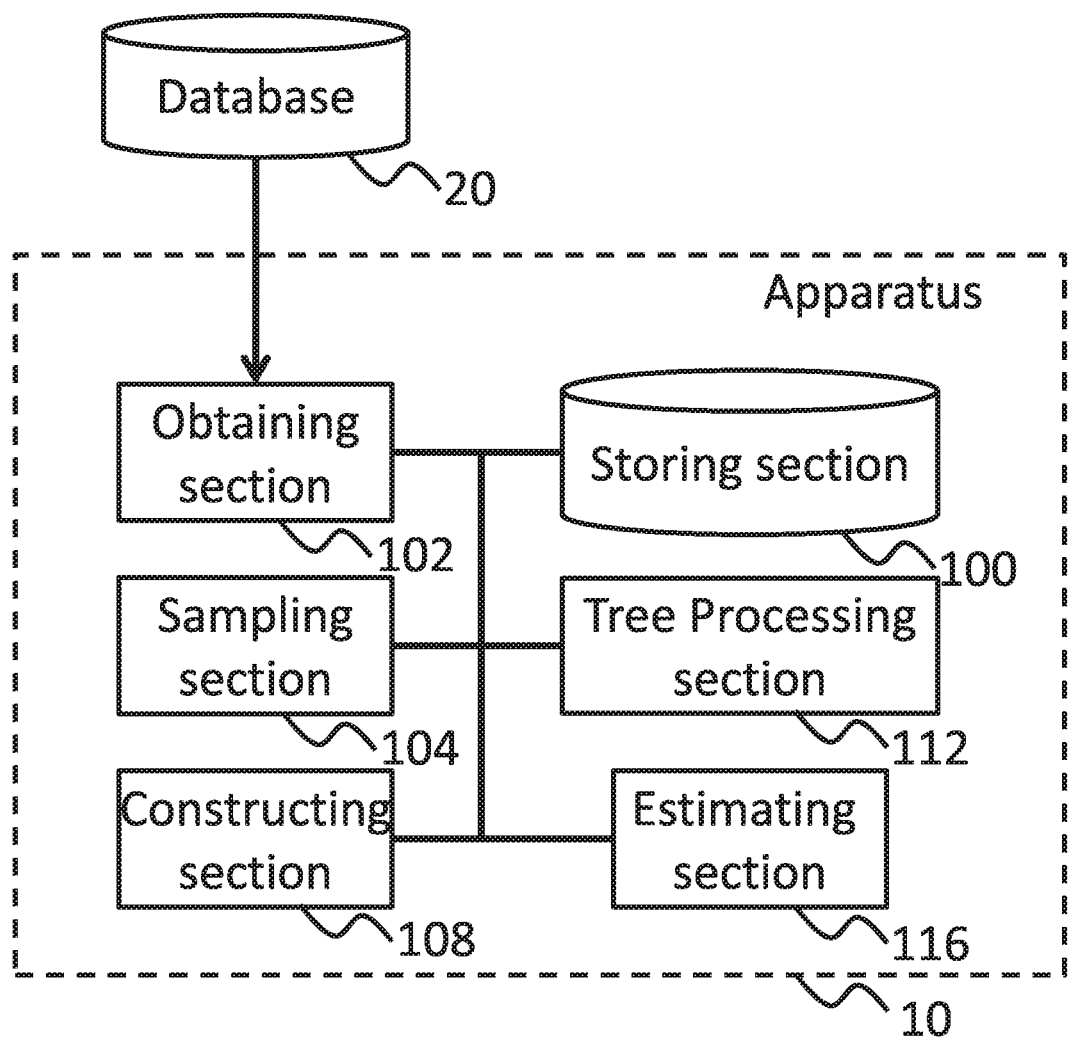
FIG. 1 shows an exemplary configuration of an apparatus 10, according to an embodiment of the present invention.

FIG. 1 shows an exemplary configuration of an apparatus 10 (e.g., a computer, programmable circuitry, etc.), according to an embodiment of the present invention. The apparatus 10 may construct at least one decision tree for estimating a ratio of probability density. The apparatus 10 may estimate the ratio of probability density of a target vector based on the at least one decision tree.

The apparatus 10 may comprise a processor and one or more computer readable mediums collectively storing instructions. The instructions, when executed by the processor or programmable circuitry, may cause the processor or the programmable circuitry to operate as a plurality of operating sections. Thereby, the apparatus 10 may be represented as a storing section 100, an obtaining section 102, a sampling section 104, a constructing section 108, a tree processing section 112, and an estimating section 116.

The storing section 100 may store a variety of data used for operations of the apparatus 10. The storing section 100 may comprise a volatile or non-volatile memory. One or more other elements in the apparatus 10 (e.g. the obtaining section 102, the sampling section 104, the constructing section 108, the tree processing section 112, the estimating section 116, etc.) may communicate directly or indirectly via the storing section 100.

The obtaining section 102 may obtain a first sample set including a plurality of first samples, and a second sample set including a plurality of second samples. Each of the first samples is represented as a vector including a plurality of parameters. Each of the second samples is also represented as a vector including the plurality of parameters. In an embodiment, the obtaining section 102 may obtain the first sample set and the second sample set from a database 20, which may be equipped outside or inside the apparatus 10, and may be in direct or indirect communication with obtaining section 102.

The obtaining section 102 may also obtain a target vector $x_T$. In an embodiment, the obtaining section 102 may receive the target vector $x_T$, input by a user of the apparatus 10.

The sampling section 104 may sample one or more first samples from the plurality of first samples of the first sample set to generate a first subset of the first sample set. The sampling section 104 may also sample one or more second samples from the plurality of second samples of the second sample set to generate a second subset of the second sample set. In an embodiment, the sampling section 104 may randomly sample the first samples and the second samples to generate the first subset and the second subset. The sampling section 104 may generate a plurality of first subsets and a plurality of second subsets.

The constructing section 108 may construct at least one decision tree for estimating a ratio of probability density $p(x)/q(x)$ based on the first sample set and the second sample set. Here, $p(x)$ is a probability density of the first samples corresponding to an input vector x and $q(x)$ is a probability density of the second samples corresponding to the input vector x. In this embodiment, $p(x)$ may be regarded as a probability density function corresponding to the first samples, and $q(x)$ may be regarded as a probability density function corresponding to the second samples.

In an embodiment, the constructing section 108 may construct a plurality of such decision trees by using the plurality of first subsets and the plurality of second subsets. The decision tree may output a ratio of probability density $p(x)/q(x)$ based on the first subset and the second subset. Details of the construction of decision trees are explained below.

The tree processing section 112 may input the target vector $x_T$ into the plurality of decision trees. The tree processing section 112 may calculate a plurality of outputs from the plurality of decision trees for the target vector $x_T$.

The estimating section 116 may obtain the plurality of outputs corresponding to the target vector $x_T$ from the plurality of decision trees and estimate a ratio of probability density $p(x_T)/q(x_T)$ based on the plurality of outputs from the plurality of decision trees. In an embodiment, the estimating section 116 may calculate an average of the plurality of outputs obtained from the plurality of decision trees, as the ratio of probability density $p(x_T)/q(x_T)$.

According to the embodiment of FIG. 1, the apparatus 10 may estimate a ratio of probability density with a plurality of decision trees, which may be regarded as a random forest, without using a basis function. Therefore, according to the embodiment, the computational resources needed for estimating the ratio of the probability density is reduced compared to conventional methods without impairing accuracy of estimation.

Figure 2:
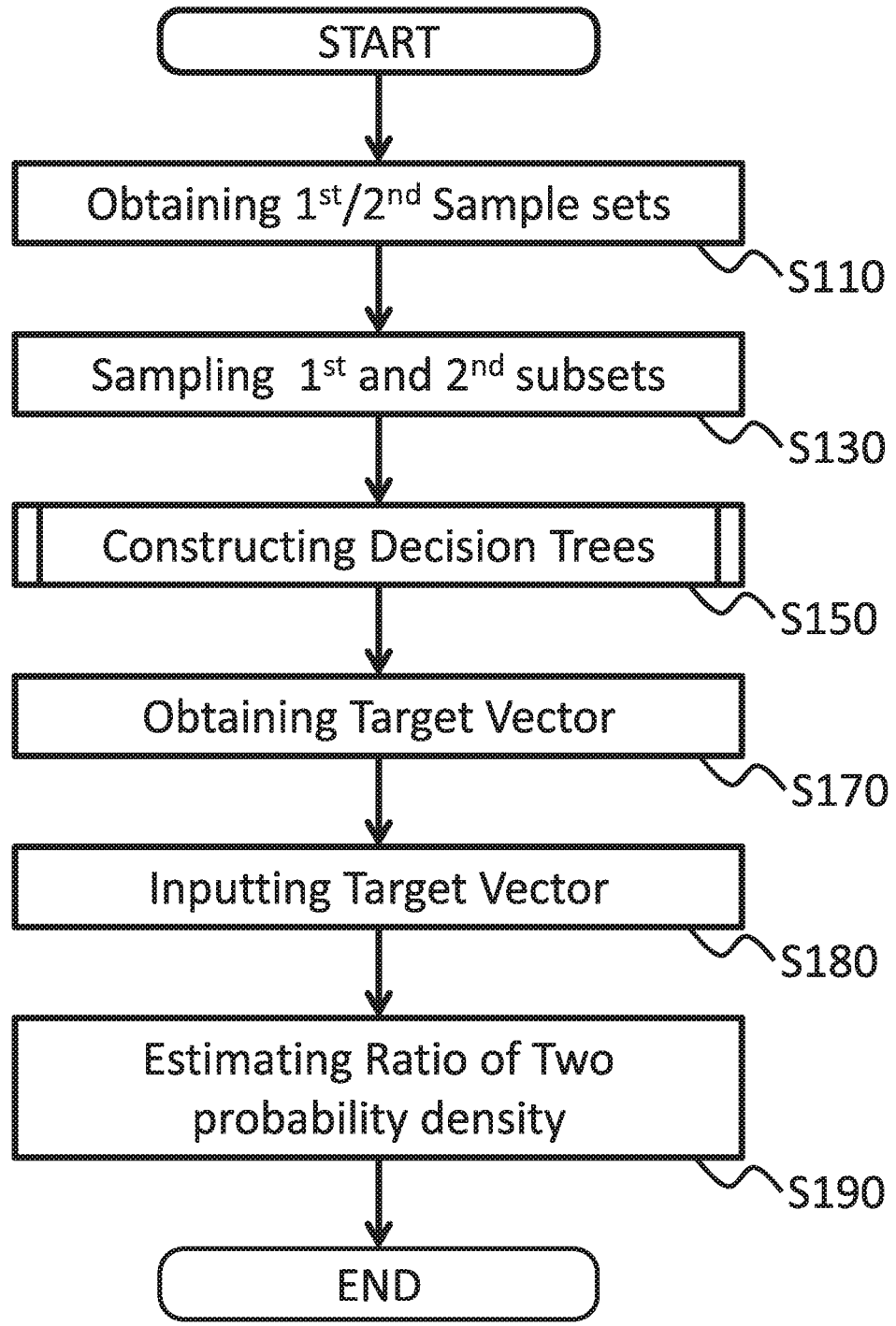
FIG. 2 shows an operational flow according to an embodiment of the present invention.

FIG. 2 shows an operational flow according to an embodiment of the present invention. The present embodiment describes an example in which an apparatus, such as the apparatus 10, performs the operations from S110 to S190, as shown in FIG. 2. The apparatus may construct decision trees for estimating the ratio of probability density during the operations S110-S150 and may estimate the ratio of probability density by utilizing the decision trees during the operations S170-S190.

In some embodiments, the apparatus may perform only a portion of the operations S110-190. For example, the apparatus may perform the operations of S110-150 or the operations of S170-190.

At S110, an obtaining section, such as the obtaining section 102, may obtain a plurality of first samples as a first sample set and a plurality of second samples as a second sample set. The first sample set P and the second sample set Q may be defined as $$P \triangleq \{x_p^{(n)}\}_{n=1}^{N} \overset{i.i.d}{\sim} p \text{ and } Q \triangleq \{x_q^{(m)}\}_{m=1}^{M} \overset{i.i.d}{\sim} q.$$

The plurality of the first samples give a first probability density $p(x)$, and the plurality of the second samples give a second probability density $q(x)$. The dimensions of the vectors of the first samples and the vectors of the second samples may be the same.

At S130, a sampling section, such as the sampling section 104, may generate a first subset by randomly sampling some of the first samples from the first sample set. The sampling section may also generate a second subset by randomly sampling some of the second samples from the second sample set. In an embodiment, the sampling section may perform sampling of the first samples and the second samples based on a bootstrap algorithm and/or a jackknife algorithm.

In an embodiment, the sampling section may generate a plurality of pairs of the first subset and the second subset, by sampling a plurality of first subsets from the first sample set and a plurality of second subsets from the second sample set. Each pair among the plurality of pairs may be used for construction of each of the plurality of decision trees. In another embodiment, the sampling section may generate one pair of the first subset and the second subset.

At S150, a constructing section, such as the constructing section 108, may construct a plurality of decision trees, each of which outputs a corresponding ratio of probability density. In an embodiment, the constructing section may construct each of the plurality of decision trees utilizing each of the plurality of pairs of the first subset and the second subset. Hereinafter, a ratio of probability density output from a t-th decision tree of T decision trees is represented as $\hat{R}_{(t)}(x)$.

Figure 3:
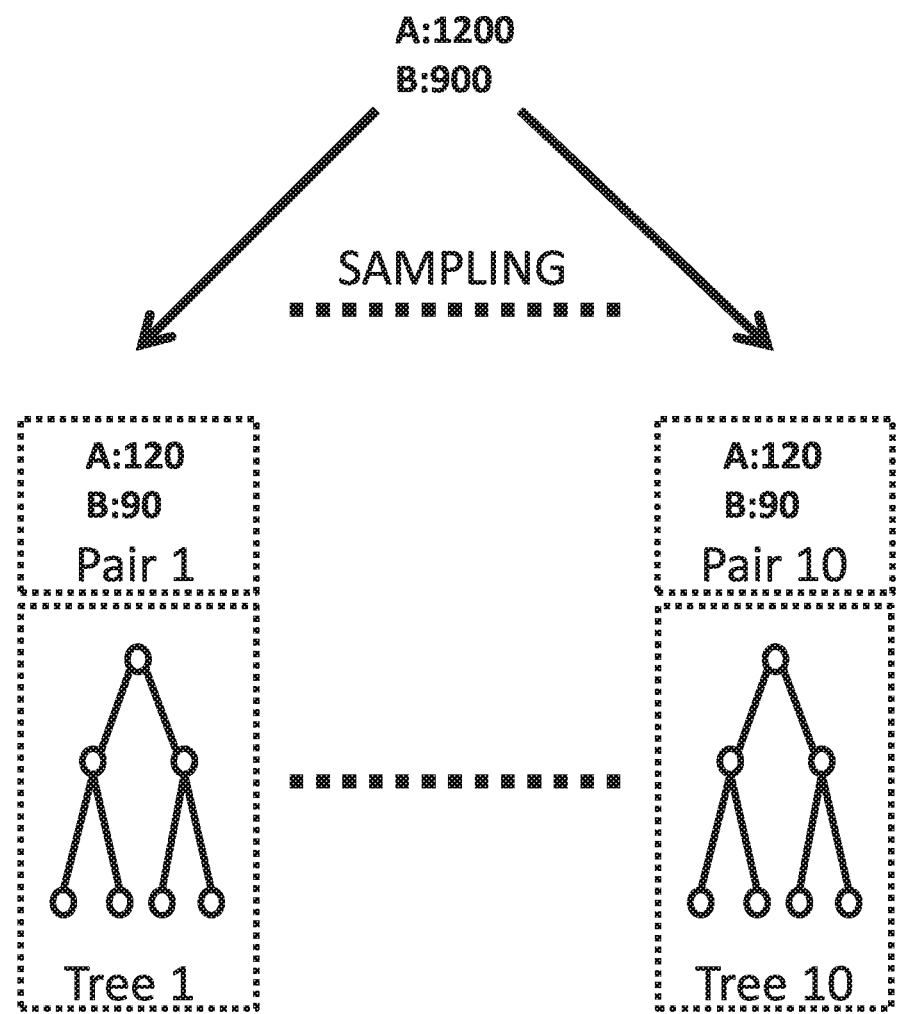
FIG. 3 shows decision trees according to an embodiment of the present invention.

FIG. 3 shows decision trees according to an embodiment of the present invention. In an embodiment of FIG. 3, the obtaining section obtains 1200 first samples (shown as "A") as the first sample set and 900 second samples (shown as "B") as the second sample set at S110. The sampling section generates ten pairs of the first subset and the second subset (shown as "Pair 1", ..., "Pair 10"), each pair having 120 first samples and 90 second samples at S130.

The constructing section constructs ten decision trees (shown as "Tree 1," "Tree 2" ... "Tree 10"). The constructing section may construct Tree 1 based on Pair 1, Pair 2 ..., construct Tree 10 based on Pair 10. Since each of Pair 1, Pair 2 ..., Pair 10 may have different sets of first samples and second samples, each of Tree 1, ..., Tree 10 may be constructed differently.

Figure 4:
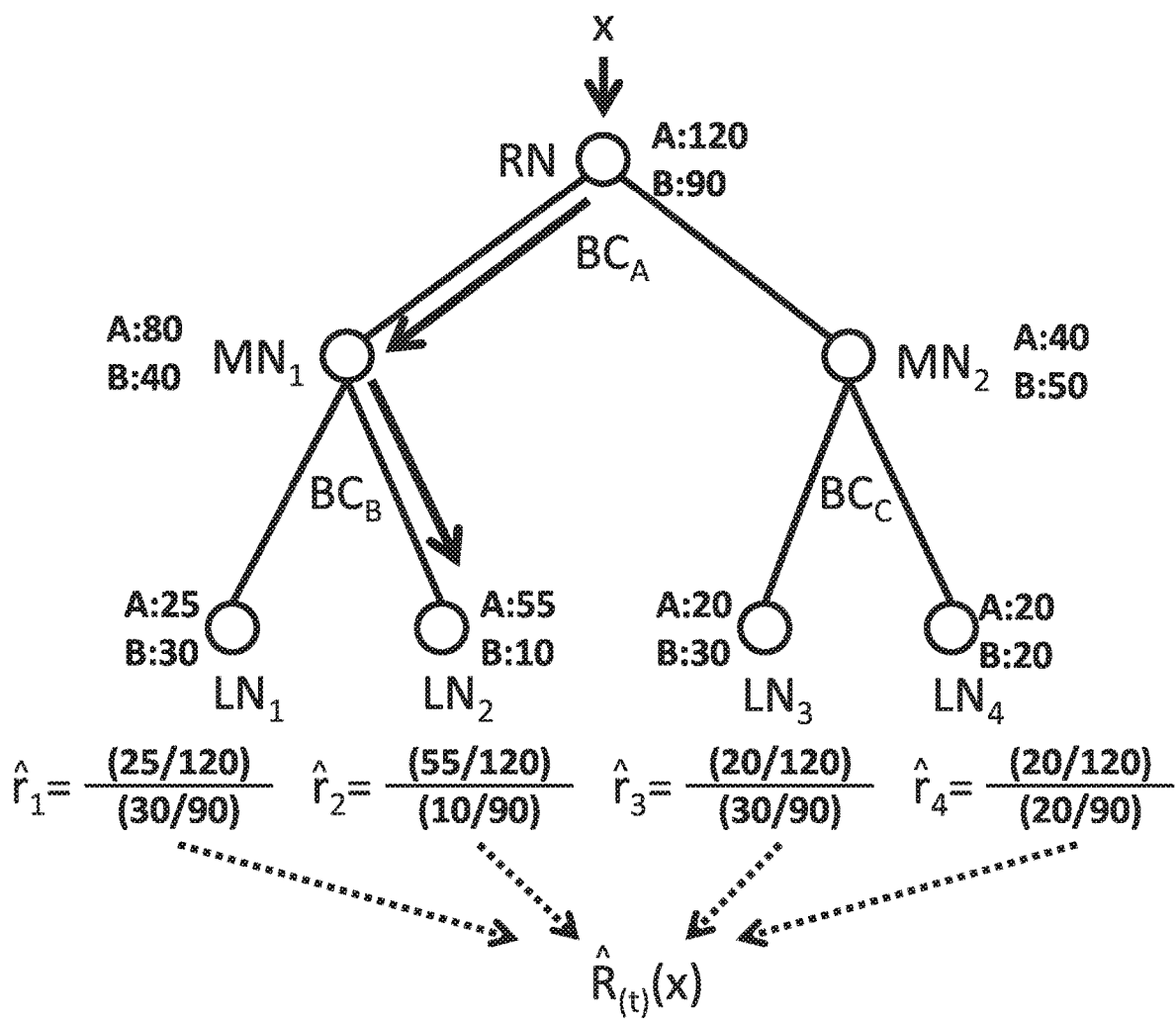
FIG. 4 shows a decision tree according to an embodiment of the present invention.

FIG. 4 shows a decision tree according to an embodiment of the present invention. In an embodiment, the constructing section may construct the decision tree of FIG. 4 as a t-th decision tree of Tree 1, Tree 2 ..., Tree 10.

In the embodiment of FIG. 4, the decision tree has a root node (shown as "RN"), two middle nodes (shown as "$MN_1$" and "$MN_2$"), and four leaf nodes (shown as "$LN_1$", "$LN_2$", "$LN_3$" and "$LN_4$"). RN has a branching condition (shown as "$BC_A$") for allocating an input vector (shown as "x") to one of $MN_1$ and $MN_2$.

The first subset including 120 first samples and the second subset including 90 second samples are allocated to the leaf nodes. Firstly, the 120 first samples and the 90 second samples are divided into $MN_1$ (80 first samples and 40 second samples) and $MN_2$ (40 first samples and 50 second samples) with $BC_A$.

$MN_1$ has a branching condition (shown as "$BC_B$") for allocating the input vector x to one of $LN_1$ and $LN_2$. The samples (80 first samples and 40 second samples) allocated to $MN_1$ are divided into $LN_1$ (25 first samples and 30 second samples) and $LN_2$ (55 first samples and 10 second samples) with $BC_B$.

$MN_2$ has a branching condition (shown as "$BC_C$") for allocating the input vector x to one of $LN_3$ and $LN_4$. The samples (40 first samples and 50 second samples) allocated to $MN_2$ are divided into $LN_3$ (20 first samples and 30 second samples) and $LN_4$ (20 first samples and 20 second samples) with $BC_C$.

Every leaf node has an estimate of a ratio of probability density. In an embodiment, the decision tree may output a ratio of a rate of the first samples allocated to a leaf node of the decision tree and a rate of the second samples allocated to the leaf node of the decision tree, as the estimate of the ratio of probability density. In a decision tree, an input vector is allocated to one of the leaf nodes, and the decision tree outputs the estimate of a ratio of probability density of the allocated leaf node in response to the input vector.

An output $\hat{R}(x)$ of decision tree model ($\hat{R}:X \to \mathbb{R}$) with I leaf nodes is represented by $\hat{R}(x)=\Sigma_{i=1}^{I}\hat{r}_i \, II(x \in L_i)$, where I is the number of leaf nodes. $L_i$ is region of an i-th leaf node in the decision tree, $L_1 \cup L_2 \cup \ldots \cup L_I = X$, $L_i \cap L_j = \emptyset$ for $i \neq j$, and II(B) is the indicator function that returns 1 if argument B is true and else returns 0.

In the embodiment of FIG. 4, $LN_1$ outputs {(25/120)/(30/90)} (shown as "$\hat{r}_1$") as the estimate of the ratio of probability density, $LN_2$ outputs {(55/120)/(10/90)} (shown as "$\hat{r}_2$") as the estimate of the ratio of probability density, $LN_3$ outputs {(20/120)/(30/90)} (shown as "$\hat{r}_3$") as the estimate of the ratio of probability density, and $LN_4$ outputs {(20/120)/(20/90)} (shown as "$\hat{r}_4$") as the estimate of the ratio of probability density.

The decision tree of FIG. 4 outputs one of $\hat{r}_1$, $\hat{r}_2$, $\hat{r}_3$, $\hat{r}_4$ as an output $\hat{R}_{(t)}(x)$ in response to an input vector x. Since the input vector x is allocated to $LN_2$ by $BC_A$ and $BC_B$ in the decision tree, the decision tree outputs a ratio of a rate of the first samples allocated to $LN_2$ and a rate of the second samples allocated to $LN_2$, which can be calculated by {(55/120)/(10/90)} as an output from the decision tree in response to the input vector x. Similarly, the decision tree outputs {(25/120)/(30/90)} when allocating the input vector x to $LN_1$ by $BC_A$ and $BC_B$, outputs {(20/120)/(30/90)} when allocating the input vector x to $LN_3$ by $BC_A$ and $BC_C$, and outputs {(20/120)/(30/90)} when allocating the input vector x to $LN_4$ by $BC_A$ and $BC_B$, as $\hat{R}_{(t)}(x)$.

In an embodiment, if a rate of the second samples allocated to a leaf node of the decision tree is calculated to be zero, an output of the decision tree from the leaf node is set to a predetermined value (e.g., the number of second samples of the decision tree, or the other constant value). In the embodiment of FIG. 4, if the number of second samples allocated to $LN_2$ is 0 and $\hat{r}_2$ would be calculated as (55/120)/(10/90), then the decision tree may output 90 as $\hat{r}_2$. Thereby, the apparatus may output a plausible value even when q(x) is very small.

At S150, the constructing section constructs each decision tree by determining branching conditions for the decision tree. In an embodiment, the constructing section may determine the branching conditions by a greedy search or random search. Details of constructing decision trees are explained below in relation to FIG. 6.

At S170, the obtaining section may obtain a target vector $x_T$, for which a ratio of probability density is to be estimated.

At S180, a tree processing section, such as the tree processing section 112, may input the target vector $x_T$ into the plurality of decision trees constructed at S150. The tree processing section may process the plurality of decision trees and obtain an output from each of the plurality of decision trees. In an embodiment, the tree processing section may calculate $\hat{R}_{(t)}(x_T)=\Sigma_{i=1}^{I(t)}\hat{r}_i^{(t)} \, II(x_T \in L_i^{(t)})$ for each decision tree (t) of the plurality of decision trees.

At S190, an estimating section, such as the estimating section 116, may estimate the ratio of probability density $p(x_T)/q(x_T)$ based on the outputs from the plurality of decision trees. In an embodiment, the estimating section may calculate an average of the plurality of outputs of the plurality of decision trees $\hat{R}^{(t)}(x_T)$, as the ratio of probabiltuy density $p(x_T)/q(x_T)$. In another embodiment, the estimating section may determine a median value of the plurality of outputs of the plurality of decision trees, as the ratio of probability density $p(x_T)/q(x_T)$.

Figure 5:
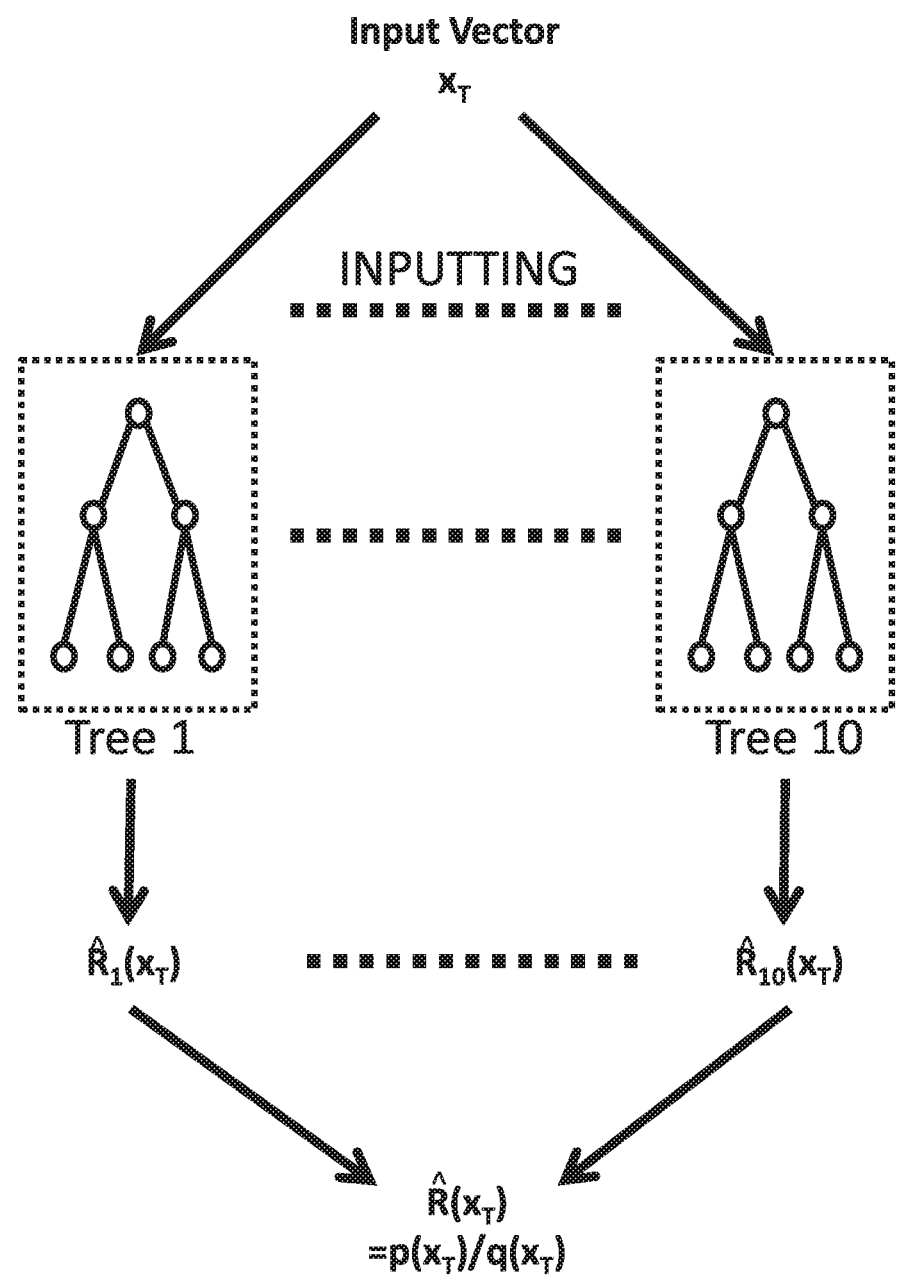
FIG. 5 shows an estimation of the ratio of probability density according to an embodiment of the present invention.

FIG. 5 shows an estimation of the ratio of probability density according to an embodiment of the present invention. In the embodiment of FIG. 5, the tree estimating section may input a target vector $x_T$ into 10 decision trees ("Tree 1," "Tree 2," ..., "Tree 10") and may determine 10 ratios of probability density of $x_T$ (shown as "$\hat{R}_1(x_T)$," "$\hat{R}_1(x_T)$," ..., "$\hat{R}_{10}(x_T)$") from the 10 decision trees. The estimating section may determine a resultant probability density (shown as "$\hat{R}(x_T)$") based on the 10 ratios of probability density.

Figure 6:
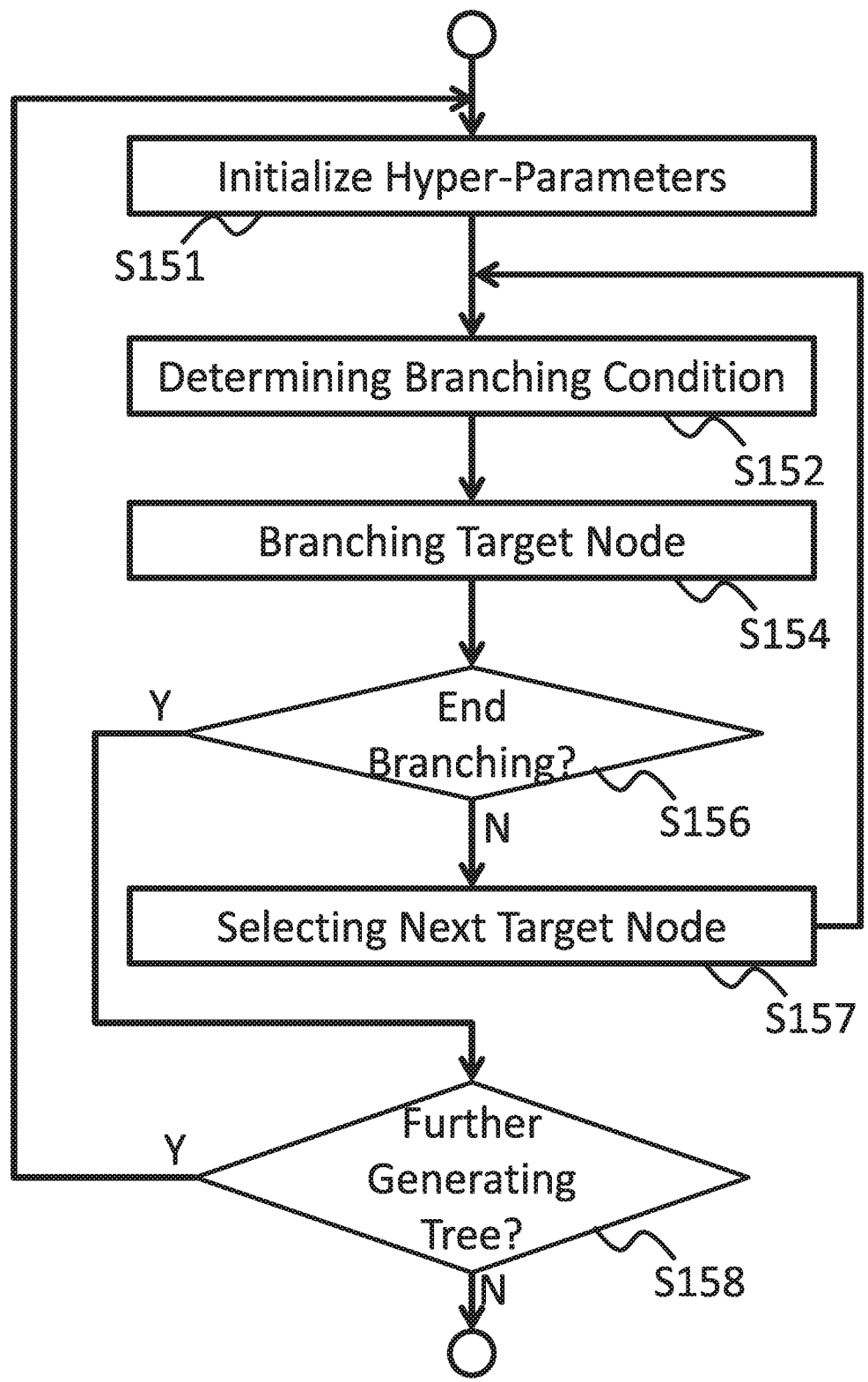
FIG. 6 shows an operational sub-flow of decision tree construction according to an embodiment of the present invention.

FIG. 6 shows an operational sub-flow of decision tree construction according to an embodiment of the present invention. In an embodiment, the constructing section may perform operations S151-S158 of FIG. 6 at the operation S150 of FIG. 2.

At S151, the constructing section may initialize hyper-parameters used for construction of a decision tree. The hyper-parameters may be the same as those used for conventional decision tree models. In an embodiment, at least a part of the hyper-parameters may be at least one of a maximum tree depth, a minimum number of first and/or second samples required to be a leaf node, etc. In an embodiment, the constructing section may optimize the hyper-parameters with a cross validation method.

At S152, the constructing section may determine a branching condition at a target node of the at least one decision tree. At a first operation of S152 for each decision tree, the target node is a root node. At the second and later operations of S152, the target node is a middle node.

In an embodiment where the construction section constructs the decision tree such as shown in FIG. 4, the constructing section may determine the branching condition $BC_A$ for the root node RN at the first S152. In the embodiment, the constructing section may determine the branching condition $BC_B$ for the node $MN_1$ at the second S152 and may determine the branching condition $BC_C$ for the node $MN_2$ at the third S152.

In the embodiment, the constructing section may determine a parameter from the plurality of parameters included in the vector representing the first samples and the second samples. In an embodiment, the constructing section may determine one parameter (e.g., $x_d$) among the vector $[x_1, x_2, \ldots, x_D]$. Then the constructing section may determine a threshold s of the determined parameter $x_d$ for the target node. Thereby, the constructing section may determine (d, s) as the branching condition.

In an embodiment, the constructing section may determine the branching condition by random search. In the embodiment, the constructing section may determine a parameter and a threshold for the target node randomly.

In another embodiment, the constructing section may determine the branching condition such that an output of an objective function corresponding to the branching condition is minimized. In the embodiment, the constructing section may search for a branching condition such that outputs of the objective function from the two nodes branched from the target node by the branching condition is minimized.

In an embodiment, the objective function approximates a squared error of an estimation of the ratio of probability density. In the embodiment, the objective function is based on: (i) rates of the number of the first samples at nodes branched from the target node according to the branching condition to the number of the first samples of the decision tree and, (ii) rates of the number of the second samples at nodes branched from the target node according to the branching condition to the number of the second samples of the decision tree.

In addition, in some embodiments, the objective function may have a penalty term for the probability density q(x) for the second samples. While the ratio of probability density p(x)/q(x) may include noise when q(x) is close to 0, the penalty term may prevent q(x) from being close to 0 to some extent. In these embodiments, the output of the objective function is positively correlated with the output of the probability density q(x).

In these embodiments, the objective function may be ideally represented by the following formula (1):

$$\int_{x \in X}(r(x)-\hat{r}(x))^2 q(x)dx \qquad (1)$$

where $$r(x) \triangleq \frac{p(x)}{q(x)},$$

$\hat{r}(x)$ represents a density ration function in a density tree model inputting the vector x and outputting the ratio of probability density at the target node corresponding to the vector x based on: (i) the rates of the first samples at the nodes branched from the target node according to the branching condition to the first samples of the decision tree and, (ii) the rates of the second samples at the nodes branched from the target node according to the branching condition to the second samples of the decision tree.

Formula (1) can be deformed to the following formula (2):

$$\int_{x \in X}\hat{r}(x)^2 q(x)dx - 2\int_{x \in X}\hat{r}(x)p(x)dx + \text{const.} \qquad (2),$$

Formula (2) can be approximated by a following formula (3):

$$\frac{1}{M_l}\sum_{m=1}^{M_l} \hat{r}(x_q^{(m)})^2 - 2\frac{1}{N_l}\sum_{n=1}^{N_l} \hat{r}(x_p^{(n)}), \qquad (3)$$

where $N_1$ is a number of the first samples at the target node of the decision tree, $M_1$ is a number of the second samples at the target node of the decision tree, $x_p^{(n)}$ represents a vector corresponding to (n)-th sample in the $N_1$ first samples, and $x_q^{(m)}$ represents a vector corresponding to (m)-th sample in the $M_1$ second samples.

The constructing section may use the objective function at least partially represented by formula (3) for determining branching condition.

Figure 7:
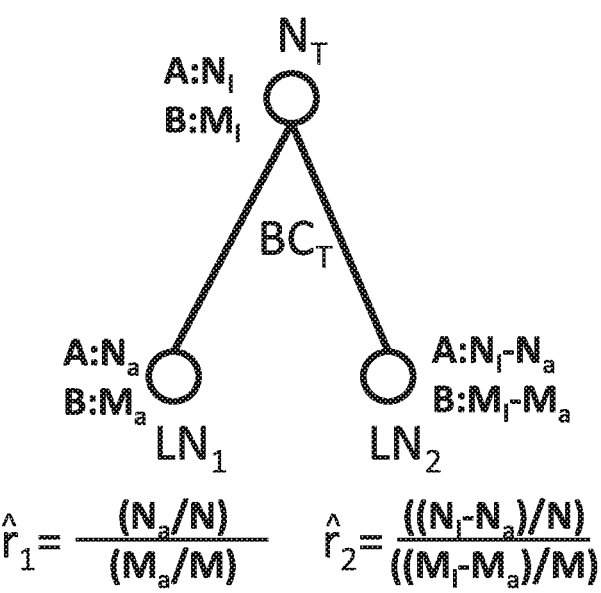
FIG. 7 shows a branching of the decision tree according to an embodiment of the present invention.

FIG. 7 shows a process of branching the decision tree according to an embodiment of the present invention. In the embodiment of FIG. 7, the constructing section may determine a branching condition $BC_T$ for branching a target node (shown as "$N_T$") to two nodes (shown as "$LN_1$" and "$LN_2$"). $LN_1$ and $LN_2$ may be each leaf nodes and/or middle nodes.

In the embodiment of FIG. 7, the decision tree as a whole has N first samples in the first subset, and M second samples in the second subset. $N_T$ has $N_1$ first samples and $M_1$ second samples. When $N_T$ is a root node, $N_1$ is equal to N and $M_1$ is equal to M. $LN_1$ has $N_a$ first samples and $M_a$ second samples. $LN_2$ has first samples ($N_1$-$N_a$) and second samples ($M_1$-$M_a$).

The rate of the first samples at $LN_1$ is calculated (by $N_a/N$), and the rate of the second samples at $LN_1$ is calculated (by $M_a/M$). Meanwhile, the rate of the first samples at $LN_2$ is calculated (by ($N_1$-$N_a$)/N), and the rate of the second samples at $LN_2$ is calculated (by ($M_1$-$M_a$)/M).

In the embodiment of FIG. 7, the ratio of probability density at $LN_1$ (shown as "$\hat{r}_1$") is $(N_a/N)/(M_a/M)$ and the ratio of probability density at $LN_2$ (shown as "$\hat{r}_2$") is $((N_1-N_a)/N)/((M_1-M_a)/M)$. In the embodiment of FIG. 7, $N_a$ first samples out of $N_1$ first samples give $\hat{r}_1$ as an output of $x_p^{(n)}$, and $N_1-N_a$ first samples out of $N_1$ first samples give $\hat{r}_2$ as an output of $x_p^{(n)}$, $M_a$ second samples out of $M_1$ second samples give $\hat{r}_1$ as an output of $x_q^{(m)}$, and $M_1-M_a$ second samples out of $M_1$ second samples give $\hat{r}_2$ as an output of $x_q^{(m)}$. Therefore, the objective function of formula (3) is deformed to the following formula (4) by using $\hat{r}_1$ and $\hat{r}_2$:

$$(\hat{r}_1^2 M_a + \hat{r}_2^2(M_1-M_a))/M_1 - 2(\hat{r}_1 N_a + \hat{r}_2(N_1-N_a))/N_1 \qquad (4)$$

In an alternative embodiment, the constructing section may use the objective function that uses the Gini coefficient and/or entropy as used in conventional decision trees, instead of the objective function shown as the formulae (1)-(4).

In an embodiment, the constructing section may select one or more parameters and one or more thresholds of the parameter(s) as the branching condition such that the output of formula (4) is minimized. In an embodiment, the constructing section may randomly select one or more parameters among the vector and then search for a threshold(s) for the parameter(s) based on the objective function. In alternative embodiment, the constructing section may search for one or more parameter(s) and the threshold(s) for the parameter(s) at the same time based on the objective function.

In an embodiment, the constructing section may calculate outputs of the objective function for all possible parameters and thresholds, and then determine a pair of a threshold and a parameter that gives the minimum output as the branching condition. In alternative embodiment, the constructing section may randomly generate pairs of a parameter and a threshold, and then select one of the pairs that gives the minimum output of objective function as the branching condition.

At S154, the constructing section may branch the target node according to the branching condition determined at the latest S152 to generate a plurality of new nodes. The constructing section may perform the branching by dividing the first samples of the target node according to the branching condition, and dividing the second samples of the target node according to the branching condition. In an embodiment, based on the branching condition (d, s), the constructing section may allocate the first sample(s) and the second sample(s) having a value of xd smaller than s ($x_d<s$) to one new node, and allocate the first sample(s) and the second sample(s) having a value of $x_d$ equal to or larger than s ($x_d>=s$) to the other new node.

At S156, the constructing section may determine whether to end the branching or not. In an embodiment, the constructing section may determine whether a predetermined condition for ending the branching is met. The predetermined condition may be at least partially defined by the hyper-parameters initialized at S151. In an embodiment, the predetermined condition may be at least one of a number of nodes and/or leaf nodes in a decision tree, a number of first and/or second samples allocated to leaf nodes, a depth of a decision tree, etc.

If deciding to end the branching, the constructing section may end the construction of the decision tree, and proceed with an operation of S158. If deciding not to end the branching, the constructing section may proceed with an operation of S157.

At S157, the constructing section may select a next target node. The constructing section may perform operations of S156 and S157 according to conventional methods for growing a decision tree. In an embodiment, the constructing section may select the next target node based on breadth-first selection, depth-first selection, or other known algorithm. Then, the constructing section may again proceed with S152 for the next target node.

At S158, the constructing section may determine whether to further construct a decision tree. In an embodiment, the constructing section may determine whether a predetermined number of decision trees have been constructed. In the embodiment of FIG. 3, when the constructing section has already generated 9 or less decision trees, the constructing section may determine to construct an additional decision tree. When the constructing section has already generated 10 decision trees, the constructing section may determine not to construct the additional decision tree.

If determining to construct the additional decision tree, the constructing section may proceed with S151 to initialize the hyper-parameters for the additional decision tree. If determining not to generate the additional decision tree, the constructing section may end the operation of S150.

In an embodiment, the operation of S150 (e.g., S151-S158) may be performed by distributed computing. In the embodiment, a plurality of hardware (computers, processors in a computer, or cores in a processor) may share the operation of S150. In a specific example, each of 10 processors in the apparatus may generate each of 10 decision trees.

According to the embodiments explained in relation to FIGS. 1-7, the apparatus may determine a ratio of probability density $p(x)/q(x)$ without tuning basis functions and with less computational resources than conventional methods. In addition, the apparatus may accurately estimate $p(x)/q(x)$ by utilizing the decision tree(s). In addition, the apparatus may estimate the ratio of probability density $p(x)/q(x)$ with less noise and using less computational resources in comparison to a method that estimates $p(x)$ and $q(x)$ individually.

In the embodiments of FIGS. 2-3, the constructing section constructs the plurality of decision trees based on the plurality of pairs of the first subset and the second subset. In another embodiment, the constructing section may construct one decision tree. In such embodiment, the apparatus may not perform the operation of S130 and treat the first sample set and the second sample set themselves as the first subset and the second subset for constructing the one decision tree at S150.

Figure 8:
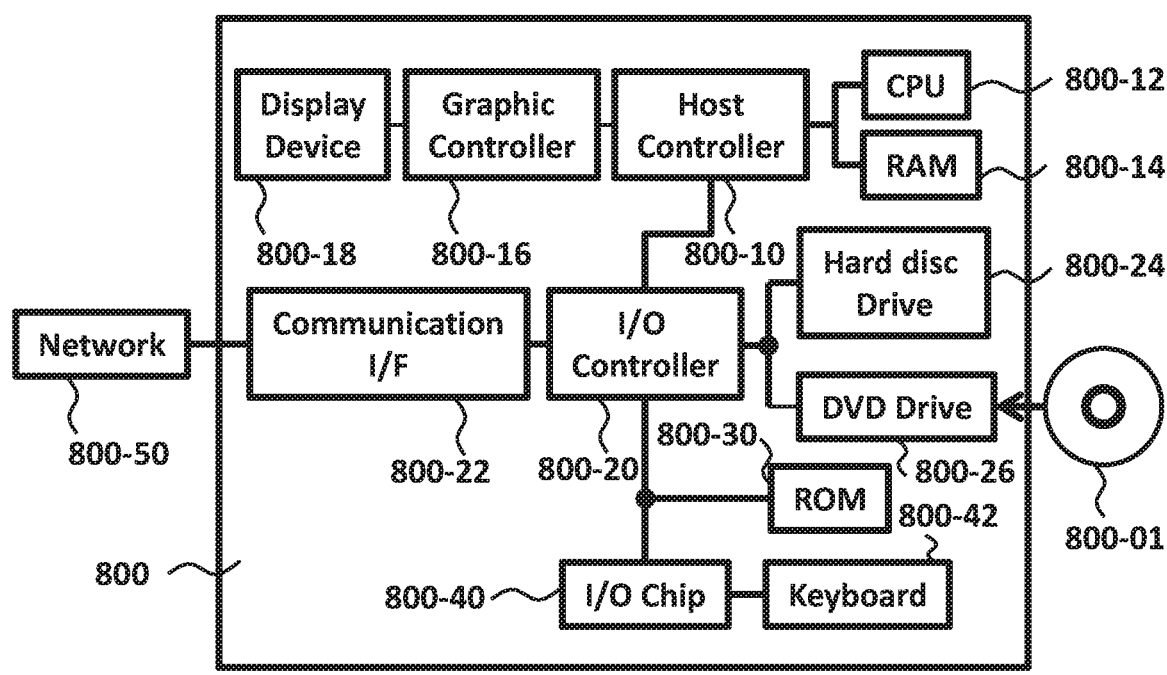
FIG. 8 shows an exemplary hardware configuration of a computer that functions as a system, according to an embodiment of the present invention.

FIG. 8 shows an exemplary hardware configuration of a computer configured for cloud service utilization, according to an embodiment of the present invention. A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program may be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, and a display device 800-18, which are mutually connected by a host controller 800-10. The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 may also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method may be constituted by realizing the operation or processing of information in accordance with the usage of the computer 800.

For example, when communication is performed between the computer 800 and an external device, the CPU 800-12 may execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 may cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 may then write back the processed data to the external recording medium.

Various types of information, such as various types of programs, data, tables, and databases, may be stored in the recording medium to undergo information processing. The CPU 800-12 may perform various types of processing on the data read from the RAM 800-14, which includes various types of operations, processing of information, condition judging, conditional branch, unconditional branch, search/replace of information, etc., as described throughout this disclosure and designated by an instruction sequence of programs, and writes the result back to the RAM 800-14.

In addition, the CPU 800-12 may search for information in a file, a database, etc., in the recording medium. For example, when a plurality of entries, each having an attribute value of a first attribute is associated with an attribute value of a second attribute, are stored in the recording medium, the CPU 800-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention enable a learning apparatus learning a model corresponding to time-series input data to have higher expressive ability and learning ability and to perform the learning operation more simply.

What is claimed is:

1. A computer program product having instructions embodied therewith, the instructions executable by a processor or programmable circuitry to cause the processor or programmable circuitry to perform operations comprising:
    obtaining a first sample set including a plurality of first samples and a second sample set including a plurality of second samples,
    constructing at least one decision tree for estimating a ratio of probability density $p(x)/q(x)$ for a particular leaf node thereof for a machine learning application based on the first sample set and the second sample set, wherein $p(x)$ is a probability density of the first samples corresponding to an input vector x and $q(x)$ is a probability density of the second samples corresponding to the input vector x such that the decision tree outputs a ratio of a rate of the first samples allocated to the particular leaf node by the input vector x over a ratio of a rate of the second samples allocated to the particular leaf node by the input vector x as the ratio of probability density $p(x)/q(x)$ when the input vector x allocated to the particular leaf node has reached the particular leaf node,
    wherein a decision to continue branching during the at least one decision tree construction is based on a depth of the at least one decision tree, a number of first samples and second samples allocated to leaf nodes of the at least one decision tree, and a number of leaf nodes in the at least one decision tree.

2. The computer program product of claim 1, wherein the constructing at least one decision tree includes constructing a plurality of decision trees, each decision tree outputting a corresponding ratio of probability density $p(x)/q(x)$.

3. The computer program product of claim 2, wherein the operations further comprises:
    sampling one or more first samples from the plurality of first samples to generate a first subset of the first sample set, and sampling one or more second samples from the plurality of second samples to generate a second subset of the second sample set,
wherein at least one of the plurality of decision trees outputs a ratio of probability density $p(x)/q(x)$ based on the first subset and the second subset.

4. The computer program product of claim 3, wherein the sampling the one or more first samples and the sampling the one or more second samples is performed based on a bootstrap algorithm.

5. The computer program product of claim 1, wherein the constructing at least one decision tree includes:
   determining the branching condition at the particular leaf node of the at least one decision tree, and
   branching the particular leaf node according to the branching condition to generate the plurality of new nodes by
      dividing the first samples of the particular leaf node according to the branching condition, and
      dividing the second samples of the particular leaf node according to the branching condition.

6. An apparatus comprising:
   a processor; and
   one or more computer readable mediums collectively including instructions that, when executed by the processor, cause the processor to perform operations including:
   obtaining a first sample set including a plurality of first samples and a second sample set including a plurality of second samples,
   constructing at least one decision tree for estimating a ratio of probability density $p(x)/q(x)$ for a particular leaf node thereof for a machine learning application based on the first sample set and the second sample set, wherein $p(x)$ is a probability density of the first samples corresponding to an input vector x and $q(x)$ is a probability density of the second samples corresponding to the input vector x such that the decision tree outputs a ratio of a rate of the first samples allocated to the particular leaf node by the input vector x over a ratio of a rate of the second samples allocated to the particular leaf node by the input vector x as the ratio of probability density $p(x)/q(x)$ when the input vector x allocated to the particular leaf node has reached the particular leaf node,
   wherein a decision to continue branching during the at least one decision tree construction is based on a depth of the at least one decision tree, a number of first samples and second samples allocated to leaf nodes of the at least one decision tree, and a number of leaf nodes in the at least one decision tree.

7. The apparatus of claim 6, wherein the constructing at least one decision tree includes constructing a plurality of decision trees, each decision tree outputting a corresponding ratio of probability density $p(x)/q(x)$.

8. The apparatus of claim 7, wherein the operations further comprises:
   sampling one or more first samples from the plurality of first samples to generate a first subset of the first sample set, and
   sampling one or more second samples from the plurality of second samples to generate a second subset of the second sample set,
   wherein at least one of the plurality of decision trees outputs a ratio of probability density $p(x)/q(x)$ based on the first subset and the second subset.

9. The apparatus of claim 8, wherein the sampling the one or more first samples and the sampling the one or more second samples is performed based on a bootstrap algorithm.

10. The apparatus of claim 6, wherein the constructing at least one decision tree includes:
    determining the branching condition at the particular leaf node of the at least one decision tree, and
    branching the particular leaf node according to the branching condition to generate the plurality of new nodes by
       dividing the first samples of the particular leaf node according to the branching condition, and
       dividing the second samples of the particular leaf node according to the branching condition.

11. The computer program product of claim 1, wherein the ratio of probability density $p(x)/q(x)$ is estimated without tuning a basis function.

12. The computer program product of claim 1, wherein the ratio of probability density $p(x)/q(x)$ for the particular leaf node is estimated by each respective one of the plurality of decision trees as a first fraction over a second fraction.

13. The computer program product of claim 12, wherein the first fraction specifies a number of allocated ones of the first samples to the particular node over an overall number of the first samples, and wherein the second fraction specifies a number of allocated ones of the second samples to the particular node over an overall number of the second samples.

14. The computer program product of claim 1, where the at least one decision tree is comprised in a random forest.

15. The computer program product of claim 1, wherein at least some of the first samples and the second samples having values greater than a threshold are allocated to a first new node from the plurality of new nodes and wherein at least some other of the first samples and the second samples having the values less than or equal to the threshold are allocated to a second new node from the plurality of new nodes.

* * * * *